(12) United States Patent
Krishnan et al.

(10) Patent No.: US 9,076,236 B2
(45) Date of Patent: Jul. 7, 2015

(54) GUIDED IMAGE UPSAMPLING USING BITMAP TRACING

(71) Applicant: AT&T INTELLECTUAL PROPERTY I, L.P., Atlanta, GA (US)

(72) Inventors: Shankar Krishnan, Chatham, NJ (US); James Klosowski, Ridgefield, CT (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 13 days.

(21) Appl. No.: 14/025,350

(22) Filed: Sep. 12, 2013

(65) Prior Publication Data

US 2015/0071533 A1    Mar. 12, 2015

(51) Int. Cl.
*G06K 9/32* (2006.01)
*G06K 15/02* (2006.01)
*G06T 3/40* (2006.01)
*H04N 1/40* (2006.01)

(52) U.S. Cl.
CPC .............. *G06T 3/4092* (2013.01); *G06T 3/4053* (2013.01); *H04N 1/40068* (2013.01); *G06T 3/403* (2013.01); *G06T 3/40* (2013.01); *G06T 3/4007* (2013.01); *G06T 3/4023* (2013.01)

(58) Field of Classification Search
CPC ....... G06T 3/40; G06T 3/4007; G06T 3/4023; G06T 3/4053; G06T 3/403; H04N 1/40068
USPC ............ 382/298–300; 345/660, 671; 358/1.2, 358/525, 528
See application file for complete search history.

(56) References Cited

U.S. PATENT DOCUMENTS

| | | |
|---|---|---|
| 5,696,848 A | 12/1997 | Patti et al. |
| 6,466,618 B1 | 10/2002 | Messing et al. |
| 6,650,704 B1 | 11/2003 | Carlson et al. |
| 7,352,919 B2 | 4/2008 | Zhou et al. |
| 7,477,802 B2 | 1/2009 | Milanfar et al. |
| 7,570,271 B1 | 8/2009 | Brandt |
| 7,646,938 B2 | 1/2010 | Berier et al. |

(Continued)

FOREIGN PATENT DOCUMENTS

| | | |
|---|---|---|
| EP | 2466901 | 6/2012 |
| EP | 2230640 | 7/2013 |

(Continued)

OTHER PUBLICATIONS

Kopf, J., Lischinski, D. 2011. Depixelizing Pixel Art. ACM Trans. Graph. 30, 4, Article 99 (Jul. 2011), 8 pages.

(Continued)

*Primary Examiner* — Kanjibhai Patel
(74) *Attorney, Agent, or Firm* — Hoffmann & Baron, LLP

(57) ABSTRACT

A method of increasing resolution of an image includes generating vector contours associated with a first image and scaling the vector contours to a second resolution. The first image has a first resolution, and the second resolution is greater than the first resolution. The vector contours are rendered to generate a guiding image at the second resolution, and a second image is generated from the first image based on the guiding image, by using joint upsampling. The second image is generated at the second resolution. The vector contours can be generated by bitmap tracing binary images at different quantization levels. An apparatus and computer readable device implementing the method of increasing the resolution of an image are also provided.

20 Claims, 4 Drawing Sheets

(56) References Cited

U.S. PATENT DOCUMENTS

| | | | |
|---|---|---|---|
| 7,889,949 | B2 | 2/2011 | Cohen et al. |
| 7,961,983 | B2 | 6/2011 | Uyttendaele et al. |
| 8,144,253 | B2 * | 3/2012 | Su et al. ............... 348/607 |
| 8,218,963 | B2 | 7/2012 | Adelsberger et al. |
| 8,417,064 | B2 | 4/2013 | Wakazono et al. |
| 8,452,087 | B2 | 5/2013 | Sun et al. |
| 8,471,905 | B2 * | 6/2013 | Kennedy et al. ........ 348/144 |
| 8,487,929 | B2 * | 7/2013 | Lyashevsky ............ 345/428 |
| 2009/0033792 | A1 | 2/2009 | Kano et al. |
| 2011/0081093 | A1 | 4/2011 | Racape et al. |
| 2012/0169848 | A1 | 7/2012 | Bae et al. |
| 2012/0200669 | A1 | 8/2012 | Lai et al. |

FOREIGN PATENT DOCUMENTS

| | | |
|---|---|---|
| WO | 2011058483 | 5/2011 |
| WO | 2012177166 | 12/2012 |
| WO | 2013006115 | 1/2013 |

OTHER PUBLICATIONS

Xiao, Chunxia, et al. "Fast multi-scale joint bilateral texture upsampling." The Visual Computer 26.4 (2010): 263-275.

Johannes Kopf, Michael F. Cohen, Dani Lischinski, and Matt Uyttendaele. 2007. Joint bilateral upsampling. In ACM SIGGRAPH 2007 papers (SIGGRAPH '07). ACM, New York, NY, USA, Article 96.

Tekalp A. et al., "High-Resolution Image Reconstruction From Lower-Resolution Image Sequences and Space-Varying Image Restoration," IEEE International Conference on Acoustics, Speech and Signal Processing, vol. III, Mar. 23, 1992, pp. 169-172, XP000378900 ISSN: 1520-6149.

K. He, et al., "Guided image filtering," IEEE Trans. Pattern Analysis Machine Intelligence (Accepted), vol. 99, No. PrePrints, pp. 1-14, Oct. 1, 2012.

P. Selinger,"Potrace:a polygon-based tracing algorithm," http://potrace.sourceforge.net/potrace.pdf Sep. 20, 2003.

* cited by examiner

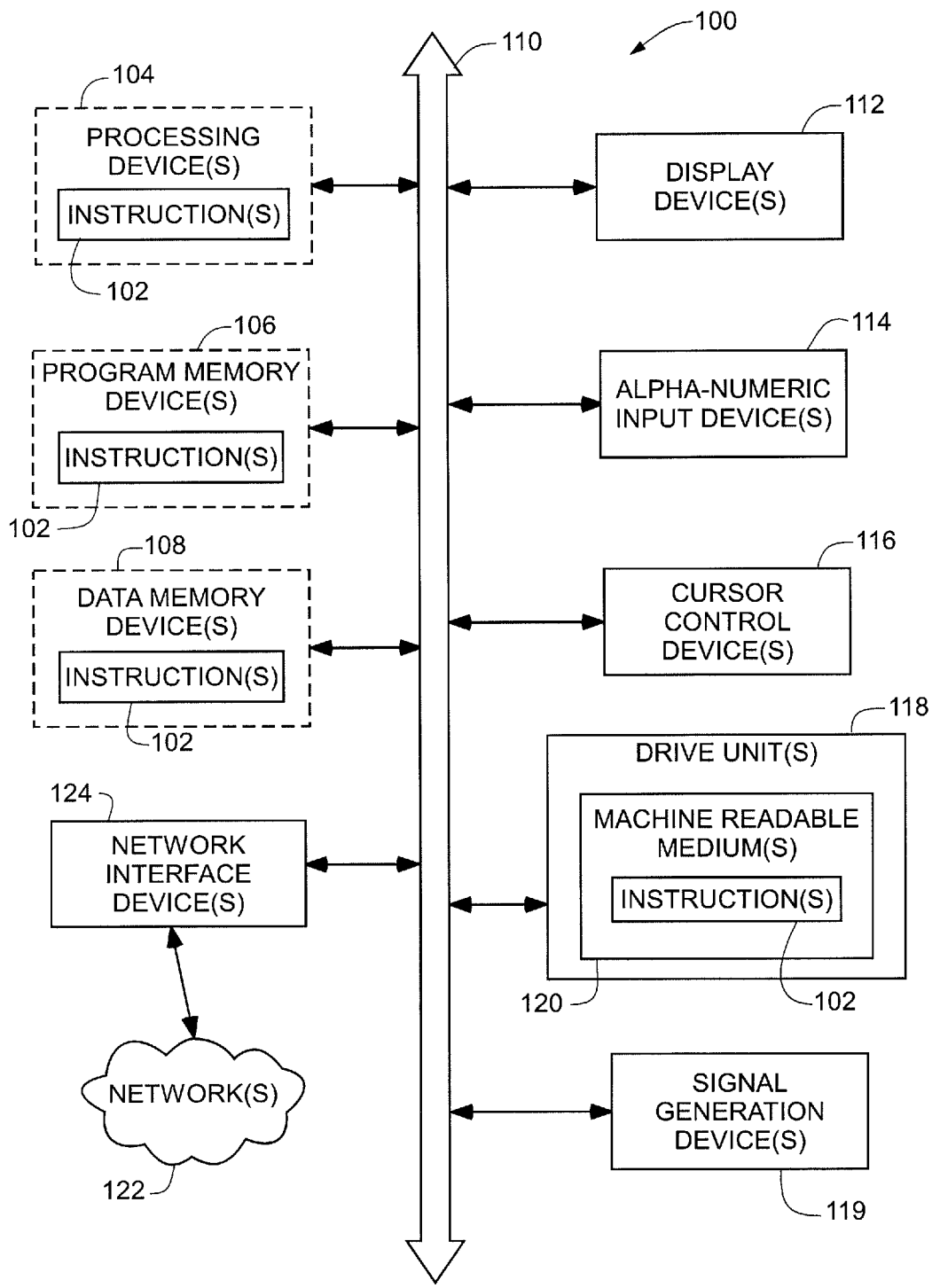

GUIDED IMAGE UPSAMPLING USING BITMAP TRACING

BACKGROUND

1. Technical Field

The present disclosure relates to upsampling of images and, more specifically, to guided image upsampling of an image to increase resolution.

2. Related Art

Image upsampling, or generation of an image at a greater, i.e., higher resolution than an initial image, is a fundamental image processing problem. The need for generating a higher resolution image from an initial image is rapidly increasing, in part, because of the rate at which content is being created, and because of the enhanced resolution of display devices, including the latest smartphones, tablets, and high-definition televisions. There is a particular need for increasing the resolution of images for display on such devices from traditionally low resolution images, such as images sent via email, downloaded from the Internet, or streamed from a content provider.

Upsampling is typically achieved by convolving an initial (lower resolution) image with an interpolation kernel or filter, and resampling the result on a target (higher resolution) grid. Interpolation filters, such as bilinear and bicubic filters, for use in such upsampling processes are well-known. Such methods include setting the value of a pixel in the target image at a higher resolution ("HR") as a weighted average of the values in the neighborhood of the pixel in an initial lower resolution ("LR") image. While the same filter is applied across the entire image for computational efficiency, these methods generate unsatisfactory artifacts in many cases. These artifacts are most perceptible along sharp edges within the image content, and can take the form of blurring, aliasing, ringing, and blocking.

To address these shortcomings, many new adaptive image interpolation algorithms have been developed, which can generally be classified into three different categories: edge-guided; example-based or "super-resolution" algorithms; and "other." The majority of known methods are edge-guided. Most edge-guided methods are based on interpolating the missing higher resolution pixels in the target (HR) image using estimated local covariance in the target image from the local covariance coefficients in the initial LR image.

Example-based super-resolution algorithms typically utilize a database to look-up, or learn, correspondences between the initial lower resolution image and target image patches. These databases can be constructed ahead of time from large image collections, but have more recently been constructed on the fly using only the initial input image, or only a small portion of it.

Additional methods that fall outside the edge-based and example-based categories include game-theoretic approaches to upsampling, which generally incorporate an iterative feedback-control loop. While this technique can lead to high quality results, performance degradation can occur when the number of iterations of the loop increase.

Another image filter is the well-known "bilateral filter," which is an edge-preserving non-linear filter that uses both a spatial (or domain) filter kernel and a range filter kernel evaluated on the data values themselves. It has been used primarily in denoising and tone mapping applications. In particular, the rationale behind the bilateral filter is that for a pixel to influence another pixel, it should not only occupy a nearby spatial location but should also have a similar color intensity value. More formally, the bilateral filtered result for a pixel p is:

$$BF[I]_p = \frac{1}{W_p} \sum_{q \in S} I_q G_{\sigma_s}(\|p - q\|) G_{\sigma_r}(|I_p - I_q|), \quad (1)$$

where I is the input image, $G_{\sigma_s}$ and $G_{\sigma_r}$, which are typically 2D Gaussian kernels, represent a spatial filter and range filter, respectively, and S (in $q \in S$) denotes the neighborhood of interest in the spatial domain. $W_p$ is a normalization factor that ensures that the pixel weights sum to one.

One variant of the bilateral filter is the Joint Bilateral Filter ("JBF"). In the JBF, a second so-called "guiding image" ($\tilde{I}$), which is of the same resolution as the input image, is used to define the edges that must be preserved:

$$JBF[I]_p = \frac{1}{W_p} \sum_{q \in S} I_q G_{\sigma_s}(\|p - q\|) G_{\sigma_r}(|\tilde{I}_p - \tilde{I}_q|). \quad (2)$$

While straight-forward implementations of the bilateral filter and its variants are computationally expensive, there have been attempts to significantly improve running times by approximating the filter equation. For example, a guided filter that is based on a local linear model and that provides a faster and superior edge-preserving filter is disclosed in K. He, et al., "Guided image filtering," *IEEE Trans. Pattern Analysis Machine Intelligence* (Accepted), vol. 99, no. PrePrints, pp. 1-14, 2012 (referred to herein as "He"), the entirety of which is incorporated herein by reference.

The methodology of the Joint Bilateral Filter has been successfully applied to a particular upsampling problem that arises from the need to reduce memory costs associated with performing computationally intensive processing tasks, such as stereo depth, image colorization, and tone mapping. In particular, an input image is first downsampled to a lower resolution in order to perform the necessary image processing tasks at computationally manageable levels. After processing, the low resolution solution must then be upsampled to the original resolution of the input image.

One technique for upsampling the low resolution solution, which is based on the Joint Bilateral Filter, is disclosed in Kopf, J., et al., "Joint Bilateral Upsampling," *ACM Transactions on Graphics*, Vol. 26, No. 3, pp. 96-100 (2007) (referred to herein as "Kopf"), the entirety of which is incorporated herein by reference. Given a high-resolution guiding image I, and a low resolution solution L obtained after processing an input image, Kopf discloses that an upsampled solution can be obtained by applying a "Joint Bilateral Upsampling" (referred to also as "JBU") technique as follows:

$$JBU[\tilde{L}]_p = \frac{1}{W_p} \sum_{q_\downarrow \in S} L_{q_\downarrow} G_{\sigma_s}(\|p_\downarrow - q_\downarrow\|) G_{\sigma_r}(|I_p - I_q|) \quad (3)$$

where p and q denote integer coordinates of the pixels in I, and $p \downarrow$ and $q \downarrow$ denote the corresponding coordinates in the low resolution solution L. The guiding image I for interpolating to the upsampled resolution in the JBU technique disclosed in the Kopf reference is the original input image. Accordingly, unlike the application of a Joint Bilateral Filter as shown in equation (2), the JBU of equation (3) operates at two different resolutions: the high resolution of the guiding image and low resolution of the downsampled low resolution solution L.

SUMMARY

Features of the disclosure will become apparent from the following detailed description considered in conjunction with the accompanying drawings. It is to be understood, however, that the drawings are designed as an illustration only and not as a definition of the limits of this disclosure.

The disclosure is directed to a method of increasing resolution of an image. The method includes receiving, using a processing device, a first image, which has a first resolution, and generating, using the processing device, vector contours associated with a first image. The method further includes scaling, using the processing device, the vector contours to a second resolution, where the second resolution is greater than the first resolution; and rendering, using the processing device, the vector contours to generate a guiding image at the second resolution. Using the processing device, a second image is then generated, at the second resolution, from the first image based on the guiding image.

In one aspect, the vector contours are generated by generating two binary images associated with the first image, where each of the two binary images is based on a different quantization level; and bitmap tracing each of the two binary images to convert the two binary images to the vector contours.

In another aspect, the second image is generated by interpolating the first image to the second resolution based on the guiding image, where the interpolating includes using joint upsampling to guide interpolating to the second resolution based on the guiding image.

In yet another aspect, wherein the first image is a color image, the method further includes converting the color image to a grayscale image in response to receiving the first image. The vector contours associated with the first image are generated from the grayscale image.

In an additional aspect, the first image is an n-bit grayscale image, and the vector contours are generated by generating a number N, which is less than $2^n$, of binary images and bitmap tracing each of the binary images to generate the vector contours. Each of the binary images is based on a different quantization level.

In yet another aspect, the method further includes generating a histogram of pixel values of the first image and allocating the different quantization levels based on low discrepancy sequence sampling of the histogram.

The vector contours are preferably rendered from an outermost quantization level $L_N$ to innermost quantization level $L_1$.

The disclosure is also related to a computer-readable device to store instructions that, when executed by a processing device, cause the processing device to perform operations to increase resolution of an image. The operations include receiving a first image, where the first image has a first resolution; generating vector contours associated with the first image; and scaling the vector contours to a second resolution, where the second resolution is greater than the first resolution. The operations further include rendering the vector contours to generate a guiding image at the second resolution; and generating a second image from the first image based on the guiding image, the second image being generated at the second resolution.

In one aspect, the operations for generating vector contours further include generating two binary images associated with the first image and bitmap tracing each of the two binary images to convert the two binary images to the vector contours. Each of the two binary images is based on a different quantization level.

In another aspect, generating the second image includes interpolating the first image to the second resolution based on the guiding image, the interpolating including using joint upsampling to guide interpolating to the second resolution based on the guiding image.

In a further aspect, the first image is a color image. The operations further include converting the color image to a grayscale image in response to receiving the first image, the vector contours associated with the first image being generated from the grayscale image.

In yet another aspect, the first image is an n-bit grayscale image. The operations include generating a number N, which is less than $2^n$, of binary images and bitmap tracing each of the binary images to generate the vector contours. Each of the binary images is based on a different quantization level.

In one aspect, the operations for rendering the vector contours further include rendering the vector contours from an outermost quantization level $L_N$ to an innermost quantization level $L_1$.

The present disclosure is also directed to an apparatus to increase resolution of an image. The apparatus includes a processing device; and memory to store instructions that, when executed by the processing device, cause the processing device to perform operations including receiving a first image, where the first image has a first resolution; and generating vector contours associated with the first image. The operations further include scaling the vector contours to a second resolution, where the second resolution is greater than the first resolution; rendering the vector contours to generate a guiding image at the second resolution; and generating a second image from the first image based on the guiding image. The second image is generated at the second resolution.

In one aspect, the operations for generating vector contours further include generating two binary images associated with the first image and bitmap tracing each of the two binary images to convert the two binary images to the vector contours. Each of the two binary images is based on a different quantization level.

In another aspect, the operations for generating the second image further include interpolating the first image to the second resolution based on the guiding image, the interpolating including using joint upsampling to guide interpolating to the second resolution based on the guiding image.

In still another aspect, the apparatus includes a display device, the operations further including displaying the second image on the display device.

In yet another aspect, the first image is an n-bit grayscale image. The operations include generating a number N, which is less than $2^n$, of binary images and bitmap tracing each of the binary images to generate the vector contours. Each of the binary images is based on a different quantization level.

In an additional aspect, the operations further include generating a histogram of pixel values of the first image and allocating the different quantization levels based on low discrepancy sequence sampling of the histogram.

In one aspect, the operations for rendering the vector contours further include rendering the vector contours from an outermost quantization level $L_N$ to an innermost quantization level $L_1$.

Other features of the present disclosure will become apparent from the following detailed description considered in conjunction with the accompanying drawings. It is to be understood, however, that the drawings are designed as an illustration only and not as a definition of the limits of the claims.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

FIG. 4 is a block diagram showing at least a portion of an exemplary machine in the form of a computing system configured to perform methods according to one or more embodiments.

DETAILED DESCRIPTION

The present disclosure is directed to a method, apparatus, and computer-readable device to increase resolution of an image. Although a sequence of images, for example, video images can be upsampled in accordance with the present disclosure, the image of interest is preferably a still image and can be a computer-generated image or generated by any appropriate electronic device, such as an image capturing/display device capable of capturing and transmitting and/or displaying an image or a sequence of images, including a digital/electronic still camera, video camera, image scanner, smartphone, tablet, television, and so on.

Figure 3:
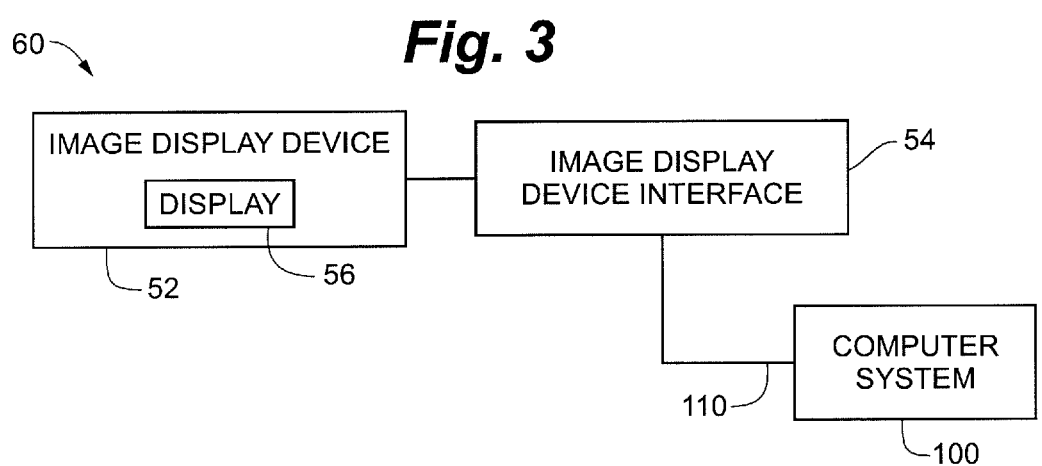
FIG. 3 is a block diagram representation of a device interfaced with an exemplary machine in the form of a computing system configured to perform methods according to one or more embodiments.

The method of the present disclosure can be implemented within a dedicated computing system, such as the computer system 100 shown in FIG. 4. Referring also to FIG. 3, the computer system 100 can receive the image for increasing its resolution directly from any image capturing/display device 52 via a device interface 54 over a bus 110, for example. In various embodiments, the device interface 54 can be any known wired or wireless interface (such as USB, IEEE standard interfaces, Bluetooth™ and so on) capable of transmitting the captured image(s) to the system 100 for implementing the methods of the present disclosure to increase image resolution. The transmitted images can be stored in any machine readable medium, as described herein, associated with the system 100 for processing in accordance with the methods of the disclosure.

The methods of the present disclosure can also be implemented within a dedicated computer system, such as the system 100 shown in FIG. 4, to increase the resolution of an image that is stored on any computer-readable media, including any removable computer-readable medium.

In addition, although the methods of the present disclosure are described as implemented in an embodiment of the computer system 100 shown in FIG. 4, it is understood that in additional embodiments, the methods can also be implemented within any suitable image capturing/display device 60, including a digital/electronic still camera, video camera, image scanner, smartphone, tablet, television smartphones, tablets, and televisions, having analogous processing and storage devices as computer system 100 for storing and executing instructions. The device 60 preferably also includes a display 56 for displaying the upsampled image.

A "bitmap" as used herein and as conventionally known is a binary image, which can be represented as a sampled grid of black and white pixels.

"Bitmap tracing" is the process of converting a bitmap (binary image) to a list of vector contours, for example, Bezier curves, or to a vector outline, which describes the binary image as an algebraic expression of its vector contours.

"Rendering" is a process of converting a vector outline to a bitmap, and is the converse of bitmap tracing.

"Joint Upsampling" as used herein is any operation for generating a higher resolution image from an input (lower resolution) image under the guidance of another (guiding) image at a higher resolution.

Joint Upsampling includes, for example, but is not limited to, the Joint Bilateral Upsampling ("JBU") technique disclosed in the Kopf reference, and the guided filter joint upsampling disclosed in the He reference.

A "guiding image" as used herein is an image used to guide the interpolation of an input image to a greater resolution in an upsampling process.

Figure 1:
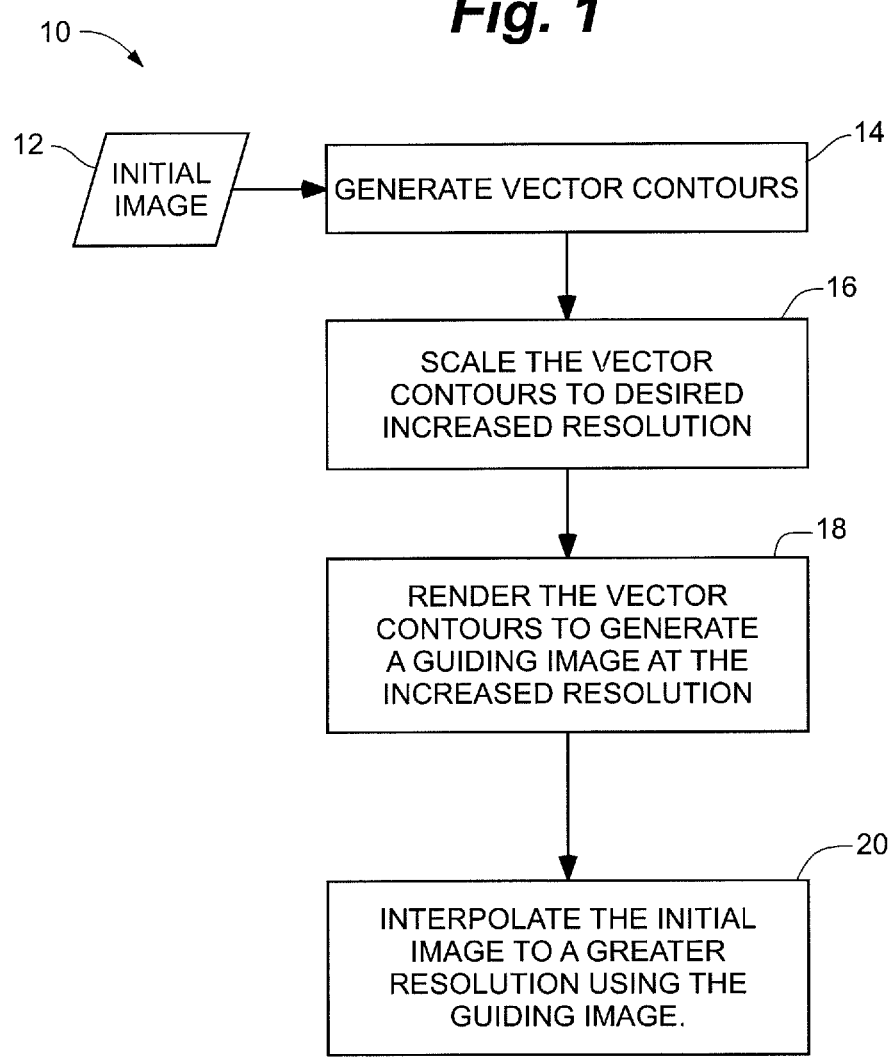
FIG. 1 is a schematic representation of an embodiment of a method of increasing resolution of an image in accordance with the present disclosure.

In the present disclosure, a guiding image is proposed that can be used, for joint upsampling an input (lower resolution) image, for example, in accordance with a Joint Bilateral Upsampling algorithm, such as shown in equation (3) supra, and variations thereof, for increasing the resolution of an image, rather than of a low resolution solution. Referring to FIG. 1, given an initial (first) image having a first resolution, one embodiment of a method 10 of the present disclosure for increasing resolution of the first image 12, includes generating vector contours 14 associated with the first image 12, and then scaling the vector contours 16 to a second (increased) resolution, where the second resolution is greater than the first resolution. The scaled vector contours are then rendered to generate a guiding image at the second resolution 18. A second image at the second (greater) resolution can then be generated by interpolating the first image to the second (greater) resolution using the guiding image 20.

The guiding image of the present disclosure, which can be a grayscale image, advantageously preserves the image content structure of the initial, lower resolution, image sufficiently to avoid the usual artifacts (blurring, jaggies, etc.) associated with filter-based upsampling.

Figure 2:
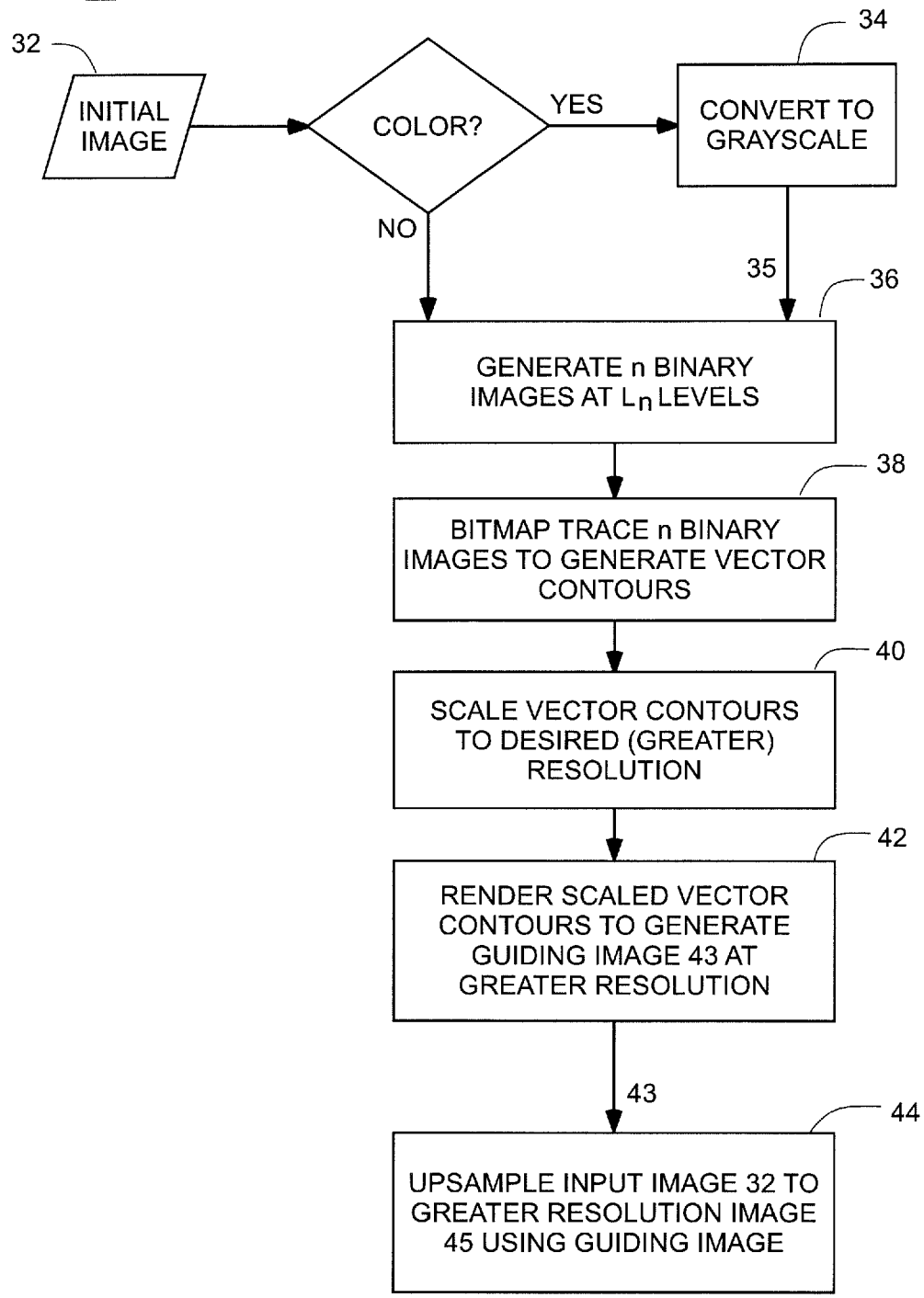
FIG. 2 is a schematic representation of another embodiment of a method of increasing resolution of an image in accordance with the present disclosure.

Referring to FIG. 2, in one embodiment 30, the vector contours associated with the initial image are generated by bitmap tracing a binary representation of the initial image. In accordance with embodiments of the present disclosure, the bitmap traced image can be upsampled in a lossless manner to the desired resolution and then used as a guide for upsampling the original image content. Unlike some other methods, there are no power of two restrictions on the scaling factors for upsampling an image, since the vector contours generated can be scaled to any size without loss of quality.

As is known in the art, a binary image can also be represented as a vector outline, typically using spline approximations, which describes the image as an algebraic expression of its vector contours, e.g., Bezier curves. One advantage of representing an image as a vector outline, or as vector contours, is that the vector contours can be scaled to any size without loss of quality. Vector outlines are especially popular in the description of fonts and logos.

The process of converting bitmaps into vector outlines is known as bitmap tracing. Several methods are known in the art for bitmap tracing. One popular open-source tracing tool which can be applied to the methods of the present disclosure is "Potrace."

The Potrace algorithm (the name is a derivation of "polygon tracer") transforms a bitmap into a vector outline in several steps. Initially, the bitmap is decomposed into a number of paths, which form the boundaries between black and white areas. In the second step, each path is approximated by an optimal polygon which is then transformed into a smooth outline. Optionally, the resulting curve is optimized by joining consecutive Bezier curve segments together wherever possible. Further details of the algorithm are disclosed in P. Selinger, "Potrace: a polygon-based tracing algorithm," http://potrace.sourceforge.net/potrace.pdf (Sep. 20, 2003), (referred to herein as "Selinger"), which is incorporated in its entirety herein by reference. Once the image is converted to vector contours 14 by bitmap tracing, for example, the vector contours can be scaled to the desired size (resolution) 16. The scaled contours are then rendered to produce the guiding image 18.

It has been shown that the rendered output of a traced image generated using Potrace's algorithm exhibits superior edge structure compared to other interpolated images (scaled by the same factor) produced using simple interpolation filters (such as the bicubic or bilinear filter).

Referring again to FIG. 2, if an initial image 32 for upsampling is in color, it is preferably converted to grayscale 34 before generating the guiding image.

In particular embodiments, a grayscale image I, which is either the initial image 32, or the converted grayscale image 35 of an initial color image, is converted to a list of vector contours given N quantization levels, $L_1 < L_2 < L_3 < \ldots < L_N$. The following table, Table 1, provides an example of pseudocode that describes a conversion of the grayscale image to vector contours by bitmap tracing.

TABLE 1

Binarize Grayscale image and bitmap trace to vector form

Input: Grayscale image I; N quantization levels $L_1 < L_2 < L_3 < \ldots < L_N$
Output: List of vector contours V
    Initialize V = Ø
    for i = 1 → N do
        Initialize binary bitmap B to a white image
        for each pixel p in B do
            if I[p] < $L_i$ then
                B[p] = 0; // make binary pixel level black
            end if
        end for
        List of contours C = Potrace(B)
        Associate all contours in C with quantization level $L_i$
        Append C to V
    end for
    return V As shown in Table 1, two or more (N) binary images B can be generated at different quantization levels L 36 as a sequence of black and white images. Each binary image is then bitmap traced to generate a list of vector contours 38 for each quantization level, using Potrace, for example. For any n-bit image, the list of vector contours can be generated for a number $N < 2^n$ quantization levels. For 8-bit grayscale images, for example, a list of vector contours can be generated for up to 255 quantization levels, which are not necessarily equally-spaced. However, experimentation has shown that for most (natural) images, 64 or 128 equally-spaced levels are sufficient to produce very accurate and visually indistinguishable results.

In one embodiment, a number N of quantization levels are chosen to be equally spaced. For example, for an n-bit grayscale image, a number $N < 2^n$ quantization levels $L_1, L_1, \ldots, L_N$ are chosen to be spread uniformly across the quantization space for bitmap tracing as follows:

$$L_i = INT\left[\frac{i-1}{N-1} * (2^n - 1)\right] \text{ for } i = 1, \ldots, N.$$

In other embodiments, the quantization levels are allocated based on a histogram of the grayscale input image. The image histogram provides the distribution of the $2^n$ intensity values from which the quantization levels can be sampled, either randomly or quasi-randomly, for example, using low discrepancy sequences.

A low-discrepancy sequence, as well-known in the art, is a sequence with the property that for all values of N, its subsequence $x_1, \ldots, x_N$ has a low discrepancy. The discrepancy of a sequence is considered low if the proportion of points in the sequence falling into an arbitrary set A is close to proportional to the measure of A, as may happen, for example, in the case of an equidistributed sequence. Specific definitions of discrepancy differ regarding the choice of A and how the discrepancy for every A is computed and combined.

Low discrepancy sequences offer some advantages over random sampling in terms of coverage and in the small sample size regime, and there are several open source libraries like LDSquences (sourceforge.net/projects/ldsequences) and libseq (www.multires.caltech.edu/software/libseq) to generate such sequences.

Once the list of vector contours are generated, they can be scaled to the desired increased resolution 40 without significant loss in quality. As described in Selinger, the bitmap tracing produces closed contours separating one color from another. Each of the closed contours in the scaled vector map are then rendered 42 to generate the guiding image 43 using any appropriate method known in the art, preferably from outermost to innermost quantization level ($L_N$ to $L_1$). Appropriate rendering software is available, for example, through the open-source librsvg (https://live.gnome.org/librsvg) and cairo (http://http://www.cairographics.org) libraries.

The guiding image 43 is then used to perform Joint Upsampling of the initial image 32, which is in grayscale or color, to generate a higher resolution image. In one embodiment, the guided filter joint upsampling technique disclosed in the He reference is applied, using the guiding image 43 of the present disclosure.

It should be noted that although the vector contours are preserved in the guiding image, the discrete nature of the quantization process appears as banding artifacts, which worsen as the scaling of the resolution increases. Accordingly, the guiding image itself does not provide a high quality upsampled output image. On the other hand, these artifacts do not affect the filtering in a Joint Upsampling algorithm significantly because the quantization levels, using Potrace, for example, are close.

FIG. 4 is a block diagram of an embodiment of a machine in the form of a computing system 100, within which a set of instructions 102, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 100 may include a processing device(s) 104 (e.g., a central processing unit (CPU), a graphics processing unit (GPU), or both), program memory device(s) 106, and data memory device(s) 108, which communicate with each other via a bus 110. The computing system 100 may further include display device(s) 112 (e.g., liquid crystals display (LCD), a flat panel, a solid state display, or a cathode ray tube (CRT)). The computing system 100 may include input device(s) 146 (e.g., a keyboard), cursor control device(s) 116 (e.g., a mouse), disk drive unit(s) 118, signal generation device(s) 119 (e.g., a speaker or remote control), and network interface device(s) 124.

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 81 may also reside, completely or at least partially, within the program memory device(s) 106, the data memory device(s) 108, and/or within the processing device(s) 104 during execution thereof by the computing system 100. The program memory device(s) 106 and the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing constructed to implement the methods described herein.

One embodiment contemplates a machine-readable medium or computer-readable device containing instructions 102, or that receives and executes instructions 102 from a propagated signal so that a device connected to a network environment 122 can send or receive voice, video, images or data, and communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives, which may be considered a distribution medium equivalent to a tangible storage medium. Accordingly, the embodiment is considered to include any one or more of a tangible machine-readable medium or a tangible distribution medium, as listed herein and including art-recognized equivalents and successor media, in which the software implementations herein are stored.

In one non-limiting, example embodiment, the computer-readable device can include a solid-state memory, such as a memory card or other package that houses one or more non-volatile read-only memories. Further, the computer-readable device can be a random access memory or other volatile re-writable memory. Additionally, the computer-readable device can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable device or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

EXAMPLE

A guiding image formed in accordance with the present disclosure was used in the guided filter joint upsampling technique disclosed in the He reference, using the following weighting factors for spatial and range filters: $\sigma s=2$ and $\sigma r=0.015$. The algorithm was implemented as a single-threaded CPU application using C++ on a Linux workstation (with two Intel® e5506 CPUs @ 2.13 GHz). Although the multiple CPU or GPU cores available were not leveraged, the algorithm does lend itself to parallel processing and the running times could be further reduced by modifying the implementation. Currently, the implementation takes up to roughly 1.5 seconds to scale 200×200 pixel images by a factor of 2. To demonstrate how the algorithm scales, the upsampling factor was also varied from 2 to 8 for a variety of images and the running times monitored. It was found that the vast majority of the time (95%) was spent on computing the high resolution guiding image in the tracing algorithm, with the remaining time spent in the upsampling step. The tracing algorithm was shown to be clearly dependent upon the number of vector contours generated for the quantization levels, or in other words, the edge complexity of the initial low resolution image content. This was evident as some images with the same pixel size required more time than others.

The quality of upsampled images generated in accordance with the present disclosure were also found to produce sharp images that are devoid of the blocky artifacts exhibited by upsampled images produced from the same initial image using bicubic filter techniques. The upsampled images generated in accordance with the present disclosure also did not exhibit the noise, discretization or pixelization along the edges that appeared in the bicubic-filtered images. In addition, unlike some other upsampling methods known in the art, no training sets are required. A single input image is upsampled as desired.

Although peak signal-to-noise ratio (PSNR) is often used to quantitatively compare upsampling results, it is known that PSNR is not always an accurate measure of visual quality of natural images. It is not expected that the joint upsampling algorithm would necessarily produce improved PSNR numbers because the tracing algorithm inherently displaces the edges slightly in the image. This directly impacts image quality measurements such as PSNR. Nevertheless, the present upsampling algorithm was compared to bicubic interpolation on a collection of images from the Kodak Lossless True Color Image Suite (http://r0k.us/graphics/kodak) and found to exhibit, on average, PSNR values 0.3 dB lower than those exhibited using bicubic interpolation.

It should be noted that although the present specification may describe components and functions implemented in the embodiments with reference to particular standards and protocols, the disclosed embodiments are not limited to such standards and protocols.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The Abstract is provided to comply with 31 C.F.R. §1.12(b), which requires an abstract that will allow the reader to quickly ascertain the nature of the technical disclosure. It is submitted with the understanding that it will not be used to interpret or limit the scope or meaning of the claims.

What is claimed is:

1. A method of increasing resolution of an image, the method comprising:
   receiving, using a processing device, a first image, the first image having a first resolution;
   generating, using the processing device, vector contours associated with the first image;
   scaling, using the processing device, the vector contours to a second resolution, the second resolution being greater than the first resolution;
   rendering, using the processing device, the vector contours to generate a guiding image at the second resolution; and
   generating, using the processing device, a second image from the first image based on the guiding image, the second image being generated at the second resolution.

2. The method of claim 1, wherein generating vector contours further comprises:
   generating two binary images associated with the first image, each of the two binary images being based on a different quantization level; and
   bitmap tracing each of the two binary images to convert the two binary images to the vector contours.

3. The method of claim 1, wherein generating the second image further comprises interpolating the first image to the second resolution based on the guiding image, the interpolating comprising using joint upsampling to guide interpolating to the second resolution based on the guiding image.

4. The method of claim 2, wherein the first image is a color image, the method further comprising converting the color image to a grayscale image in response to receiving the first image, the vector contours associated with the first image being generated from the grayscale image.

5. The method of claim 1, wherein the first image is an n-bit grayscale image, generating vector contours further comprising generating a number N of binary images and bitmap tracing each of the binary images to generate the vector contours, wherein the number N is less than $2^n$, each of the binary images being based on a different quantization level.

6. The method of claim 5, wherein rendering the vector contours comprises rendering the vector contours from an outermost quantization level $L_N$ to an innermost quantization level $L_1$.

7. The method of claim 5, further comprising generating a histogram of pixel values of the first image and allocating each of the different quantization levels based on low discrepancy sequence sampling of the histogram.

8. A computer-readable device to store instructions that, when executed by a processing device, cause the processing device to perform operations comprising:
receiving a first image, the first image having a first resolution;
generating vector contours associated with the first image;
scaling the vector contours to a second resolution, the second resolution being greater than the first resolution;
rendering the vector contours to generate a guiding image at the second resolution; and
generating a second image from the first image based on the guiding image, the second image being generated at the second resolution.

9. The computer-readable device of claim 8, wherein the operations for generating vector contours further comprise generating two binary images associated with the first image and bitmap tracing each of the two binary images to convert the two binary images to the vector contours, each of the two binary images being based on a different quantization level.

10. The computer-readable device of claim 8, wherein generating the second image further comprises interpolating the first image to the second resolution based on the guiding image, the interpolating comprising using joint upsampling to guide interpolating to the second resolution based on the guiding image.

11. The computer-readable device of claim 9, wherein the first image is a color image, the operations further comprising converting the color image to a grayscale image in response to receiving the first image, the vector contours associated with the first image being generated from the grayscale image.

12. The computer-readable device of claim 9, wherein the first image is an n-bit grayscale image, generating vector contours further comprising generating a number N of binary images and bitmap tracing each of the binary images to generate the vector contours, wherein the number N is less than $2^n$, each of the binary images being based on a different quantization level.

13. The computer-readable device of claim 12, wherein the operations for rendering the vector contours further comprise rendering the vector contours from an outermost quantization level $L_N$ to an innermost quantization level $L_1$.

14. The computer-readable device of claim 13, the operations further comprising generating a histogram of pixel values of the first image and allocating the different quantization levels based on low discrepancy sequence sampling of the histogram.

15. An apparatus to increase resolution of an image, the apparatus comprising:
a processing device; and
memory to store instructions that, when executed by the processing device, cause the processing device to perform operations comprising:
receiving a first image, the first image having a first resolution;
generating vector contours associated with the first image;
scaling the vector contours to a second resolution, the second resolution being greater than the first resolution;
rendering the vector contours to generate a guiding image at the second resolution; and
generating a second image from the first image based on the guiding image, the second image being generated at the second resolution.

16. The apparatus of claim 15, wherein the operations for generating vector contours further comprise generating two binary images associated with the first image and bitmap tracing each of the two binary images to convert the two binary images to the vector contours, each of the two binary images being based on a different quantization level.

17. The apparatus of claim 15, wherein the operations for generating the second image further comprise interpolating the first image to the second resolution based on the guiding image, the interpolating comprising using joint upsampling to guide interpolating to the second resolution based on the guiding image.

18. The apparatus of claim 15, further comprising a display device, wherein the operations further comprise displaying the second image on the display device.

19. The apparatus of claim 15, wherein the first image is an n-bit grayscale image, the operations for generating vector contours further comprising generating a number N of binary images and bitmap tracing each of the binary images to generate the vector contours, wherein the number N is less than $2^n$, each of the binary images being based on a different quantization level.

20. The apparatus of claim 19, wherein the operations for rendering the vector contours further comprise rendering the vector contours from an outermost quantization level $L_n$ to an innermost quantization level $L_1$.

* * * * *